United States Patent

Tagami et al.

[11] Patent Number: 5,237,364
[45] Date of Patent: Aug. 17, 1993

[54] CAMERA SHUTTER

[75] Inventors: Shigeru Tagami; Kazuo Akimoto; Katsuhiko Matsushita; Kanji Ito, all of Chiba, Japan

[73] Assignee: Seikosha Co., Ltd., Tokyo, Japan

[21] Appl. No.: 717,444

[22] Filed: Jun. 19, 1991

[30] Foreign Application Priority Data

Jun. 21, 1990 [JP] Japan .................. 1-163550

[51] Int. Cl.$^5$ .................................. G03B 7/08
[52] U.S. Cl. ........................ 354/435; 354/437
[58] Field of Search .............. 354/435, 437, 439

[56] References Cited

U.S. PATENT DOCUMENTS

| | | | |
|---|---|---|---|
| 3,950,765 | 4/1976 | Nanba et al. | 354/444 |
| 4,325,614 | 4/1982 | Grimes | 354/437 |
| 4,354,748 | 10/1982 | Grimes et al. | 354/437 X |
| 4,763,155 | 8/1988 | Oda et al. | 354/435 |
| 4,907,027 | 3/1990 | Kobe et al. | 354/435 |
| 4,989,030 | 1/1991 | Naka et al. | 354/435 |
| 5,014,082 | 5/1991 | Farrington | 354/437 |

FOREIGN PATENT DOCUMENTS 62-163027 7/1987 Japan .
62-194239 8/1987 Japan .

Primary Examiner—Michael L. Gellner
Assistant Examiner—Jae N. Noh
Attorney, Agent, or Firm—Jordan and Hamburg

[57] ABSTRACT

A camera shutter system includes a matrix memory, an arrangement for determining the initial speed of a shutter sector, and a source of exposure values. The memory stores shutter-exposure pulse data elements, and is addressed by functions of the determined speed and the exposure values. A motor coupled to the sector is controlled in response to an accessed pulse data element. The data elements may relate only to variable portions of movement of the shutter, and be added to fixed values in order to minimize the size of the memory.

3 Claims, 5 Drawing Sheets

CAMERA SHUTTER

FIELD OF THE INVENTION

This invention relates to a camera shutter especially adapted to compensate, in a feedforward control manner, for disturbances such as decreasing of battery power, fluctuation of a discharging peak due to a conflict between the load of a motor for driving the camera shutter and other loads, and changing of the conditions of use of a camera, such as sighting posture, temperature and humidity.

BACKGROUND OF THE INVENTION

A sector forming a part of a camera shutter is generally a mechanical element which is actuated by rotating a motor to define an exposure quantity and an aperture diameter. Therefore, if the rotation of the motor fluctuates due to a change in battery power, the exposure quantity and aperture diameter cannot be defined properly, and the synchronized operation of a strobe light cannot be attained, leading to inferior photography.

According to Japanese Laid Open Patent Document No. 62-163027 "Speed Control Device of Camera Shutter Driving Motor", the shutter close time relating to an exposure quantity $E_V$ is stored in a memory circuit in the form of data for control of a motor speed or data for control of the width of driving pulses to be sent to a motor. As soon as the operating speed of a sector is detected, the width of the driving pulses is determined on the basis of the data stored in the memory circuit, whereby proper exposure is attained by controlling the rotational speed of the motor.

According to Japanese Laid Open Patent Document No. 62-194239 "Camera Shutter Control Device", the time from the starting of rotation of a shutter driving motor to the time when a sector begins to open is detected, and on the basis of the time thus detected, the closure time of a shutter opening is set, whereby proper exposure is attained irrespective of the battery voltage.

According to Japanese Laid Open Patent Document No. 62-163027 and Japanese Laid Open Patent Document No. 62-194239 as described above, to prevent the motor from operating improperly due to fluctuation in the battery voltage, the rotational speed of the motor is controlled, or one data element out of an exposure control data table is selected corresponding to the brightness on the basis of the motor speed.

When the shutter sector is actuated by a motor whose rotor is made of a permanent magnet, however, the opening diameter in correlation with the elapsed time changes due to several parameters, one of which is the speed of the sector.

Therefore, if the sector speed and the brightness are subjected to calculation and the calculation result is used to access the data, accurate control cannot be attained.

Further, if accurate calculation is desired, the arithmetic circuit must be complicated and the volume of data thereby increased. It is difficult to control the actuation of the sector in a short time.

SUMMARY OF THE INVENTION

It is an object of the present invention to overcome the above disclosed problems, and to provide a camera shutter which can compensate in a feedforward control manner, with disturbances resulting from, for example, decreasing of battery power, fluctuation of a discharging peak, and changing of the conditions of use of a camera, such as sighting posture, temperature and humidity, by the inclusion of memory means for storing matrix data. This data is accessed as a function of an exposure quantity and a hierarchical sector open/close speed to determine the width of driving pulses being applied to a motor for driving a sector for opening/closing a lens opening.

To accomplish the foregoing object, a camera shutter according to the present invention comprises a motor, a sector for opening and closing a shutter opening in response to the rotation of the motor, and photo-interruptor signal output means for detecting the position of the sector to deliver a photo-interruptor signal. A sector open/close speed detecting means is provided for detecting the speed of the sector immediately after its starting on the basis of the photo-interruptor signal, and an exposure quantity calculating means for calculating an exposure quantity as a function of the brightness of an object to be photographed. The brightness is measured by photometer means. Memory means are provided for storing matrix data, and the data is accessed as a function of the exposure quantity calculated by the exposure quantity calculating means and the hierarchial open/close speed of the sector detected by the sector open/close speed detecting means to determine the width of driving pulses being applied to the motor.

BRIEF DESCRIPTION OF THE DRAWINGS

An embodiment of a camera shutter according to the present invention will now be described in greater detail with reference to the drawings.

DESCRIPTION OF THE PREFERRED EMBODIMENTS

Figure 1:
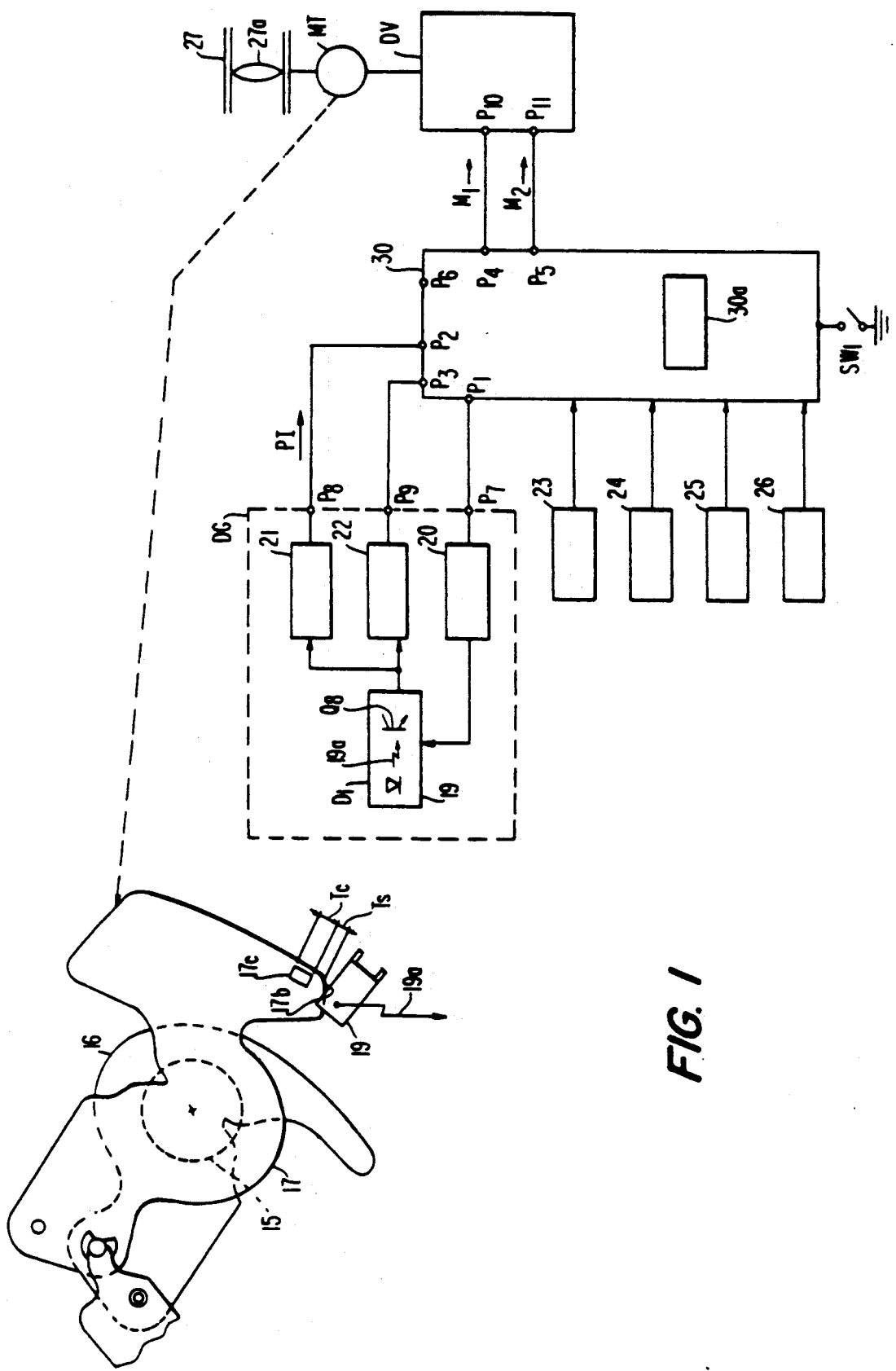
FIG. 1 is a block diagram of a camera shutter according to the present invention.

As shown in FIG. 1, a camera shutter comprises a motor MT for moving sectors 16 and 17; a PI signal generating circuit DG including a photo coupler 19 comprised of a light emitting diode $D_1$ and a light receiving transistor $Q_8$, a starter circuit 20, a PI signal sending circuit 21, and a data access circuit 22. A motor driving circuit DV includes transistors $Q_1$ through $Q_6$ for driving a motor coil MC; and a CPU 30 including a ROM 30a. The CPU 30 has a program in the ROM for calculation of an exposure quantity as a function of the brightness of an object to be photographed, which is measured by a photometer section 24.

Figure 2:
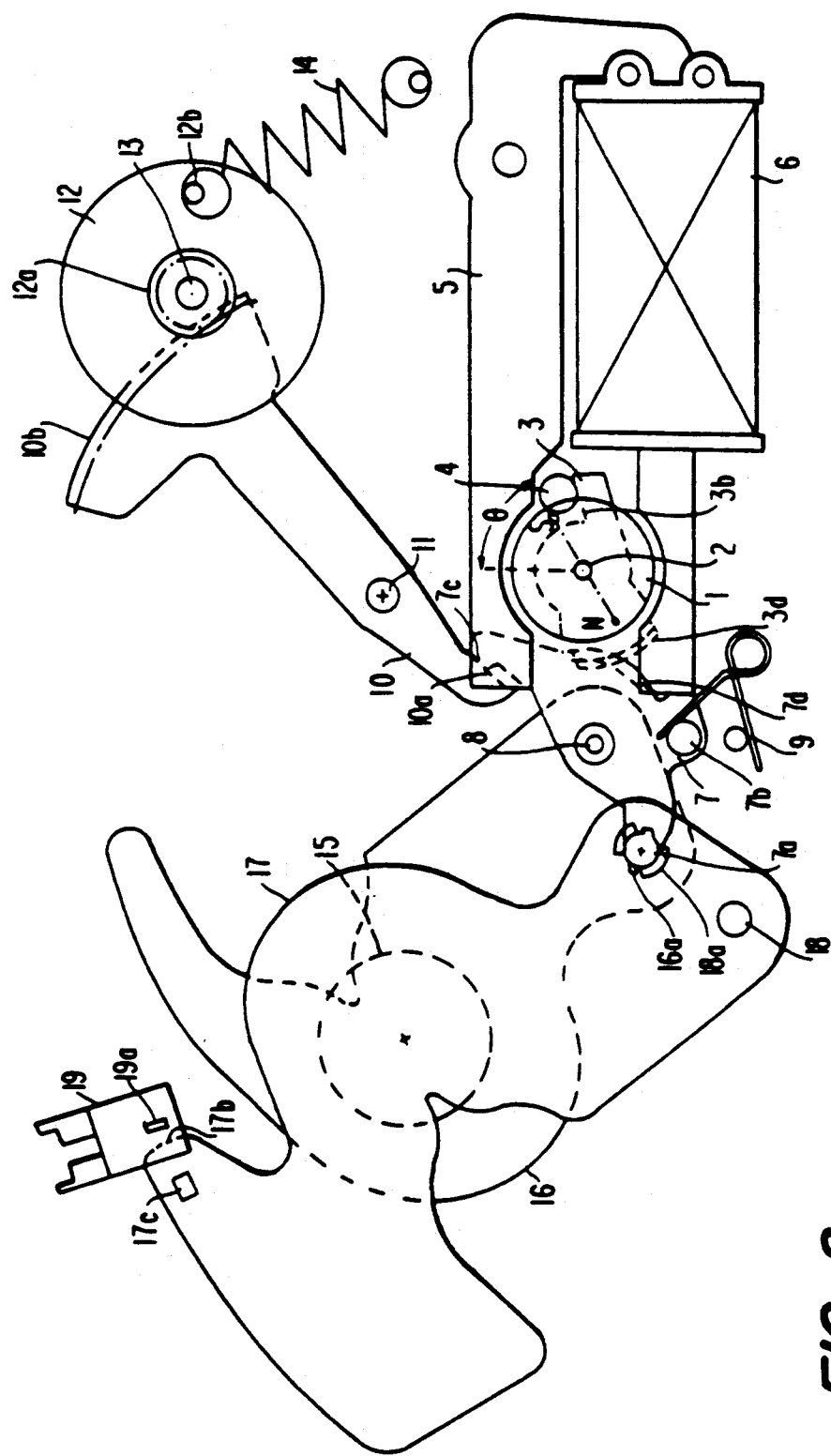
FIG. 2 is a structural diagram showing sectors and a rotor as shown in FIG. 1.

As shown in FIG. 2, the rotor 1 of the motor MT is a permanent magnet radially magnetized to have two poles. A rotor shaft 2 is press-fitted to the rotor at the center of the magnet. A rotor pinion 3 has a gear portion 3a in engagement with a gear portion 7d of an open/close lever 7, and an arm portion 3b acting as stopper. This arm portion 3b is designed so that when a motor coil 6 is not energized, the rotor 1 stops an angular displacement $\theta$ of about 58 degrees from a stationary position. This angle is determined by the press-fit angle of the arm portion 3b of the rotor pinion 3 with respect to the magnetization angle of the rotor 1.

A stator 5 and the motor coil 6 are mounted outside the rotor 1, and the motor coil 6 can be energized in both, forward and backward directions, that is, the sectors 16 and 17 open in response to forward energization and close in response to backward energization. Specifically, when the motor coil 6 is forwardly energized, the magnetic pole of the stator 5 and the opposing magnetic pole of the rotor 1 have the same polarity, so that the rotor 1 is repulsed and rotated. Backward energization results in the opposite state.

The open/close lever 7 has a pin 7a for driving the sectors 16 and 17, a protrusion 7b serving as the point of action of a spring 9, a projection portion 7c for pushing an intermediate lever 10, and a gear portion 7d engaging the rotor pinion 3.

The spring 9 urges the open/close lever 7 in the closing direction, so that even when the motor coil 6 is not energized, the sectors 16 and 7 are urged by the spring 9 from the open position toward the closed position.

The intermediate lever 10 has an arm portion 10a acting on the open/close lever 7 and a gear portion 10b engaging a gear portion 12a of a flywheel 12. This flywheel 12 has a gear portion 12a and a protrusion 12b on which a flywheel spring 14 acts. The flywheel spring 14 urges the flywheel 12 and the intermediate lever 10 in the shutter closing direction, and in the initial state, the intermediate lever 10 abuts the projection portion 7c of the open/close lever 7.

The sector 16 is pivoted to the rotational center 8 of the open/close lever 7, and the pin 7a is rotatably fitted in a slot 16a.

The sector 17 is pivoted to a front casing 18, and the pin 7a fitted in the sector 17 is rotatably fitted in a slot 18a, as is the sector 16.

The sector 17 has an edge 17b and a rectangular hole 17c positioned to intercept or pass, respectively, a light beam 19a of the photo coupler 19.

The photo coupler 19 is designed so that a peripheral portion of the sector 7 is inserted between its light emitting and light receiving sections. A photo-interruptor signal (referred to as PI signal) output by the photo coupler 19 has an H level in the initial state when the beam passes and an L level when the sector 17 is driven to intercept the beam 19a. Further, the signal again has the H level when the beam passes through the rectangular hole 17c and the L level when the edge of the rectangular hole 17c intercepts the beam.

Figure 3:
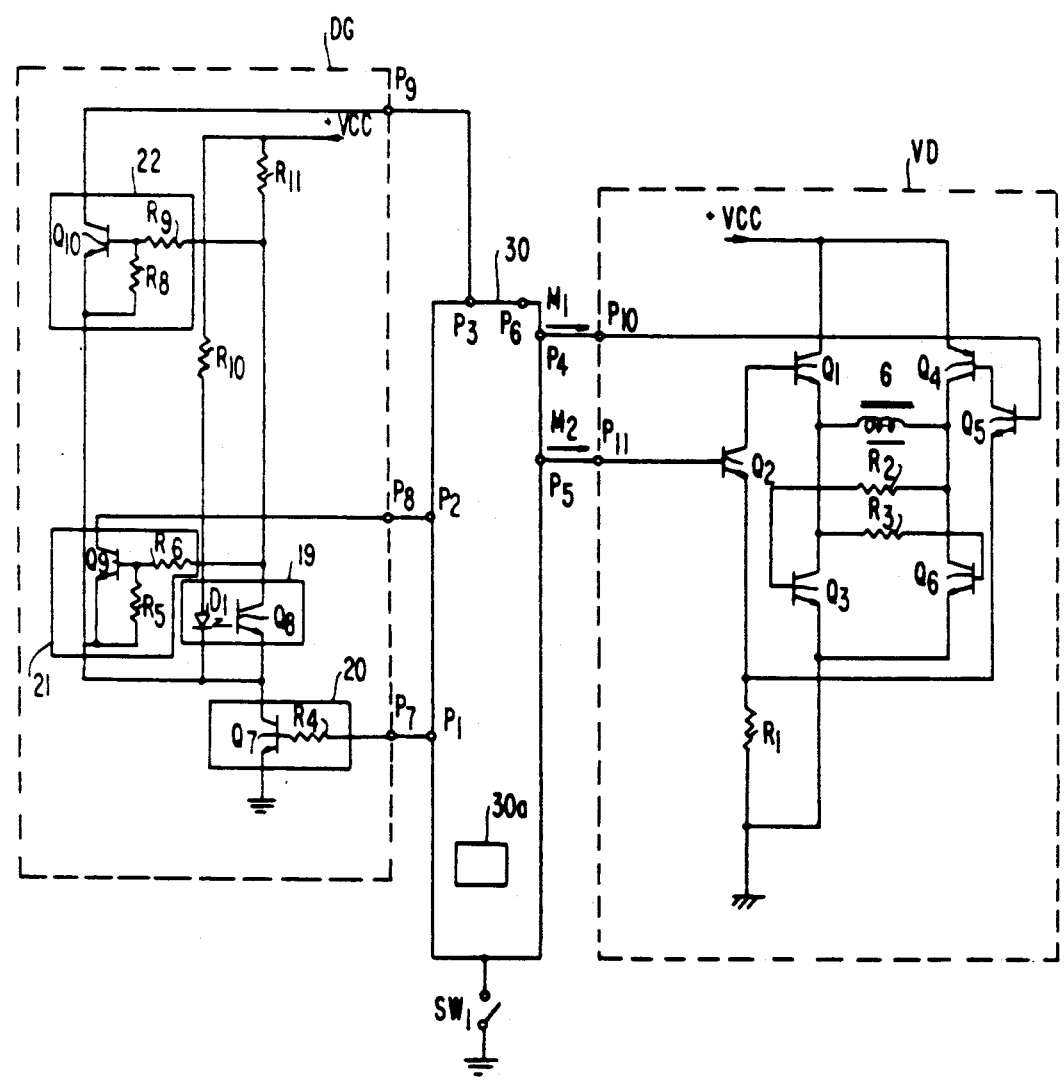
FIG. 3 is a circuit diagram showing a portion of the arrangement of FIG. 1.

As shown in FIG. 3, the PI signal generating circuit DG and the motor driving circuit DV of FIG. 1 are designed so that the pins $P_1$, $P_2$, $P_3$ and $P_4$, $P_5$ of the CPU 30 are connected to the pins $P_7$, $P_8$, $P_9$ of the PI signal generating circuit DG and the pins $P_{10}$, $P_{11}$ of the motor driving circuit DV, respectively.

The starter circuit 20 of the PI signal generating circuit DG is comprised of a transistor $Q_7$ and a resistor $R_4$, the base of the transistor $Q_7$ is connected through the resistor $R_4$ to the pin $P_7$ with its emitter connected to a reference potential point. When driven by the CPU 30, the transistor $Q_7$ turns on to bring the reference potential point into communication with the photo coupler 19, the PI signal sending circuit 21, and the data access circuit 22, through its collector.

The cathode of the light emitting diode $D_1$ and the emitter of the light receiving transistor $Q_8$ in the photo coupler 19 are connected to the collector of the transistor $Q_7$, and the anode of the light emitting diode $D_1$ and the collector of the light receiving transistor $Q_8$ are connected to a power source $+V_{cc}$ through resistors $R_{10}$ and $R_{11}$, respectively.

The base of a transistor $Q_9$ of the PI signal sending circuit 21 is connected through a resistor $R_6$ to the collector of the light receiving transistor $Q_6$, its emitter is connected to the collector of the transistor $Q_7$, and its collector is connected to the pin $P_8$, si that the PI signal is applied from the collector to the pin $P_8$.

The base of a transistor $Q_{10}$ of the data access circuit 22 is connected through a resistor $R_9$ to the collector of the light receiving transistor $Q_8$, and its collector is connected to the pin $P_9$.

The respective bases of the transistors $Q_2$ and $Q_5$ of the motor driving circuit DV are connected to the pins $P_{11}$ and $P_{10}$, respectively, and the $M_1$ and $M_2$ signals are normally at the L level. When the $M_1$ signal assumes the H level with the $M_2$ signal at the L level, the transistors $Q_5$, $Q_3$ and $Q_4$ turn on to energize the motor coil 6 in the direction of the solid-line arrow, so that the sectors 16 and 17 are opened. On the contrary, when the $M_2$ signal assumes the H level, the transistors $Q_2$, $Q_1$ and $Q_6$ turn on, so that the sectors 16 and 17 are closed.

Figure 4:
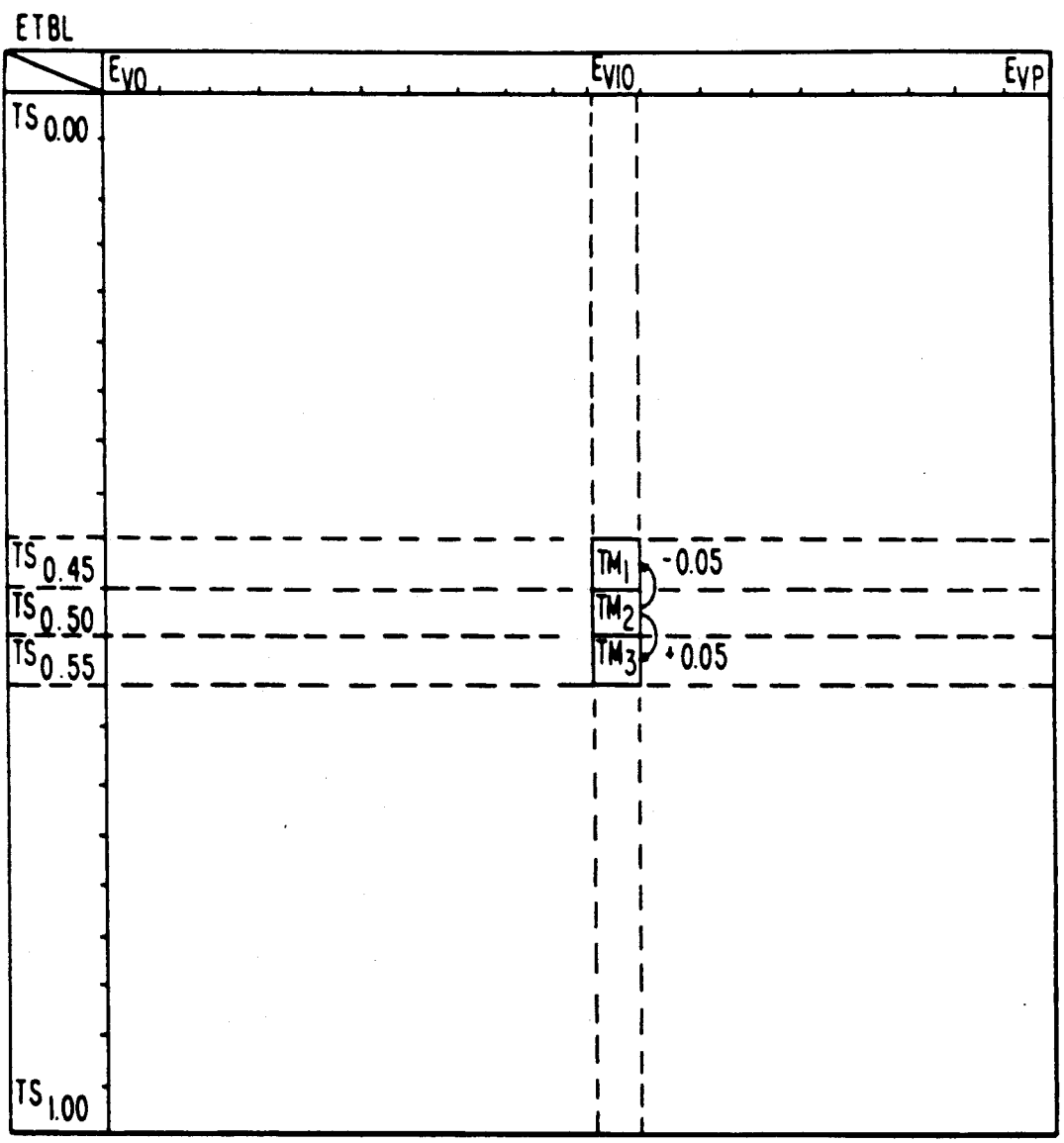
FIG. 4 is a structural diagram of a shutter-exposure pulse table.

The ROM 30a of the CPU 30 contains a shutter-exposure pulse data table ETBL as shown in FIG. 4.

The shutter-exposure pulse data table ETBL is comprised of shutter-exposure pulse data elements $TM_n$ which are addressed in matrix form as a function of a starting speed coefficient ranging from 0 to 1 and an exposure quantity represented $E_{VO}$ to $E_{VP}$. For example, the shutter-exposure pulse data element $TM_2$, referenced by the exposure quantity $E_{V10}$ and the starting speed coefficient 0.50, changes to $TM_1$ when the starting speed coefficient decreases by 0.05 and to $TM_3$ when it increases by 0.05.

Assume that TS represents the distance from the edge 17b to the leading margin of the rectangular hole 37c of the section 17 shown in FIG. 1, beam width TC represents the distance from the leading margin to the trailing margin of the rectangular hole 17c, and TM represents the distance from the trailing margin. After the sector 17 begins to move, the shutter-exposure pulse data table ETBL is addressed using the starting speed coefficient TS of FIG. 4 as defined above.

In FIG. 1, block 23 represents a film-sensitivity detecting section, block 25 represents a distance measuring section, block 26 represents a mode selecting section, block 27 represents a lens-barrel, block 27a represents a lens, and $SW_1$ is a release button.

OPERATION OF THE SYSTEM OF THE INVENTION

Figure 5:
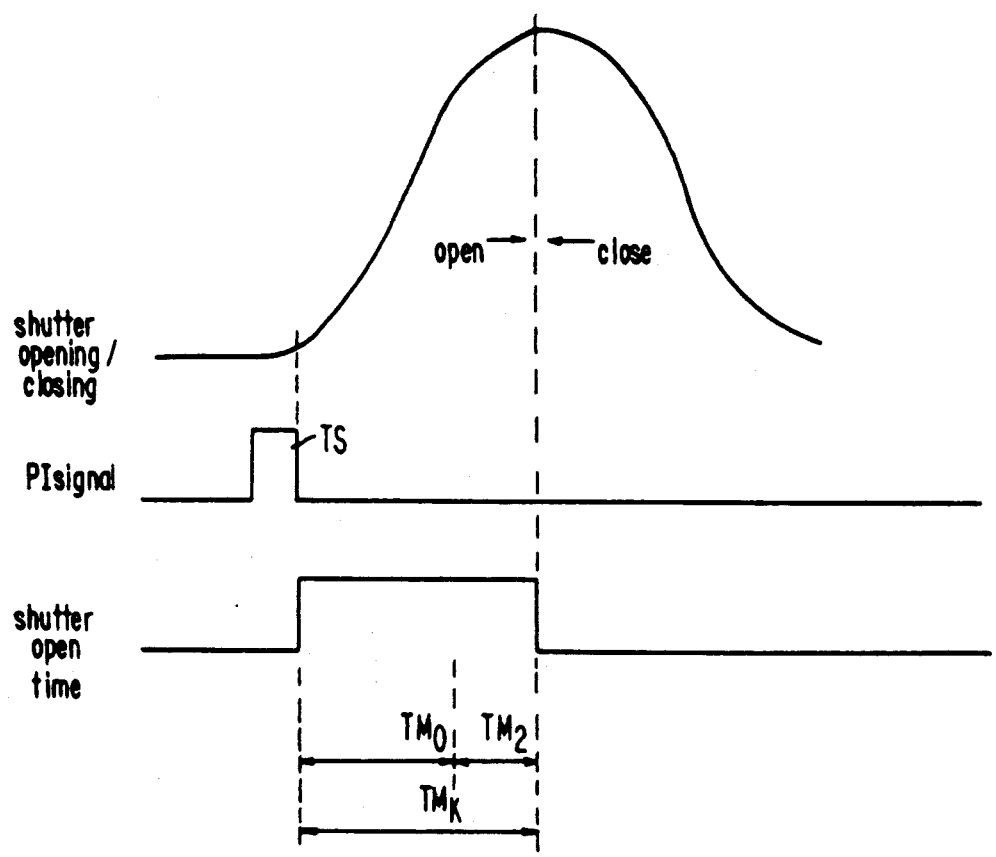
FIG. 5 is a timing diagram showing the operation of the shutter.

In the above-described camera shutter, when the release button $SW_1$ is depressed, the edge 17b of the sector 17 is inserted between the light emitting diode $D_1$ and light receiving transistor $Q_8$ of the photo coupler 19 to intercept the light beam 19a, so that the PI signal is sent from the PI signal sending circuit 21 to the pin P2 of the CPU 30. The PI signal causes the photo coupler 19 to operate for a given interval of time when the optical axis of the photo coupler 19 comes into alignment with the hole section 17c of the sector 17. The elapsed time up to this moment enables a prediction of the speed of the sector 17 passing along the TS, TC and TM shown in FIG. 1. That is, when the speed of the sector 17 is fast under the influence of voltage, temperature, etc., the elapsed time is relatively short, whereas when it is slow, the elapsed time is relatively long. In this way, the starting speed coefficient TS is determined, and consequently, the shutter-exposure pulse data element $TM_2$ shown in FIG. 4 is read out where the exposure quantity $E_{v10}$ is given. The exposure pulse data element $TM_2$ corresponds to a variable part of a total shutter open time $TM_k$ as shown in FIG. 5, and the starting speed coefficient $TM_{0.00}$ to a fixed part $TM_0$. Since the exposure pulse data element $TM_2$ corresponding to the variable part is short, i.e., has a minimum number of data bits, the memory capacity of the ROM 30a can be reduced.

In the foregoing embodiment, the data processing operation between the CPU 30 and the PI signal generating circuit DG inclusive of the starter circuit 20, PI signal sending circuit 21 and data access circuit 22 may be changed into a serial mode of operation so that the pins $P_1$, $P_2$, $P_3$, $P_7$, $P_9$ and $P_8$ can be combined.

The camera shutter according to the present invention comprises a motor, a sector for opening and closing a shutter opening in response to the rotation of the motor, and a photo-interruptor signal output means for detecting the position of the sector to deliver a photo-interruptor signal. Sector open/close speed detecting means are provided for detecting the speed of the sector immediately after its starting in response to the photo-interruptor signal, and exposure quantity calculating means are provided for calculating an exposure quantity as a function of the brightness of an object to be photographed. The brightness is measured by photometer means. Memory means are connected to store matrix data which is addressed as a function of the exposure quantity calculated by the exposure quantity calculating means and the hierarchical open/close speed of the sector detected by the sector open/close speed detecting means to determine the width of driving pulses being applied to the motor. As a result, disturbances resulting from changing of the conditions of use of the camera, such as the camera posture, temperature and humidity, can be dealt with in an open-loop feedforward control manner, the shutter open time which is a target can be determined quickly, and the memory capacity can be reduced.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A camera shutter comprising a motor, a sector for opening and closing a shutter opening in response to the rotation of the motor, photo-interruptor signal output means for detecting the position of the sector to deliver a photo-interruptor signal, sector open/close speed detecting means for detecting the speed of the sector immediately after its starting in response to the photo-interruptor signal, exposure quantity calculating means for calculating an exposure quantity as a function of the brightness of an object to be photographed, and memory means for storing matrix data, said memory means being addressable as a function of the exposure quantity calculated by the exposure quantity calculating means and the hierarchical open/close speed of the sector detected by the sector open/close speed detecting means, to determine the width of driving pulses being applied to the motor.

2. The camera shutter of claim 1 further comprising photometer means for determining the brightness of the object to be photographed.

3. A camera shutter system comprising a motor, a sector coupled to said motor for opening and closing a shutter opening, a photo-interruptor signal generating means positioned to provide photo-interrupter signals for determining the speed of movement of said sector upon movement of said sector from an initial position, means for determining an exposure value as a function of brightness of an object to be photographed, a matrix memory storing a plurality of shutter-exposure pulse data elements, means for accessing said matrix memory as a function of said determined speed and said exposure value to obtain a corresponding data element, said means for accessing comprising means for addressing the rows and columns of said matrix memory as a function of said determined speed and exposure value, and means for controlling said motor as a function of said corresponding data element.

* * * * *